US012530347B2

(12) United States Patent
Lin et al.

(10) Patent No.: US 12,530,347 B2
(45) Date of Patent: Jan. 20, 2026

(54) SUGGESTING QUERIES BASED UPON KEYWORDS

(71) Applicant: Yahoo Assets LLC, New York, NY (US)

(72) Inventors: Su-Chen Lin, Taipei (TW); Jian-Chih Ou, New Taipei (TW); Tzu-Chiang Liou, New Taipei (TW); Wei-Lun Su, Yi-Lan (TW)

(73) Assignee: Yahoo Assets LLC, New York, NY (US)

( * ) Notice: Subject to any disclaimer, the term of this patent is extended or adjusted under 35 U.S.C. 154(b) by 0 days.

(21) Appl. No.: 18/587,652

(22) Filed: Feb. 26, 2024

(65) Prior Publication Data

US 2024/0193156 A1 Jun. 13, 2024

Related U.S. Application Data

(63) Continuation of application No. 17/851,786, filed on Jun. 28, 2022, now Pat. No. 11,914,582, which is a continuation of application No. 16/448,132, filed on Jun. 21, 2019, now Pat. No. 11,372,924.

(51) Int. Cl.
| | |
|---|---|
| *G06F 16/20* | (2019.01) |
| *G06F 16/242* | (2019.01) |
| *G06F 16/2457* | (2019.01) |
| *G06F 16/9032* | (2019.01) |
| *G06F 16/951* | (2019.01) |
| *G06F 16/9535* | (2019.01) |
| *G06F 18/214* | (2023.01) |
| *G06N 20/00* | (2019.01) |

(52) U.S. Cl.
CPC .... *G06F 16/2428* (2019.01); *G06F 16/24578* (2019.01); *G06F 16/90324* (2019.01); *G06F 16/951* (2019.01); *G06F 16/9535* (2019.01); *G06F 18/214* (2023.01); *G06N 20/00* (2019.01)

(58) Field of Classification Search
None
See application file for complete search history.

(56) References Cited

U.S. PATENT DOCUMENTS

| | | | | |
|---|---|---|---|---|
| 6,546,388 B1 * | 4/2003 | Edlund | ............... | G06F 16/9538 707/999.005 |
| 8,478,699 B1 * | 7/2013 | Alfonseca | ............... | G06N 5/022 706/12 |
| 9,830,353 B1 * | 11/2017 | Dalmia | ............... | G06F 16/2453 |

(Continued)

*Primary Examiner* — Belix M Ortiz Ditren
(74) *Attorney, Agent, or Firm* — Cooper Legal Group LLC

(57) ABSTRACT

One or more computing devices, systems, and/or methods for generating a list of suggested queries associated with one or more keywords are provided. For example, one or more keywords may be received via a search interface. A plurality of queries associated with the one or more keywords may be determined based upon the one or more keywords and a historical query database. A plurality of relationship scores associated with the plurality of queries may be generated based upon a plurality of search sessions associated with the historical query database. The historical query database may be analyzed to determine a plurality of click rates associated with the plurality of queries. A list of suggested queries may be generated based upon the plurality of relationship scores and the plurality of click rates.

20 Claims, 10 Drawing Sheets

(56) References Cited

U.S. PATENT DOCUMENTS

| | | | |
|---|---|---|---|
| 2009/0100047 A1* | 4/2009 | Jones | H04L 67/30 |
| | | | 707/999.005 |
| 2010/0211588 A1* | 8/2010 | Jiang | G06F 16/332 |
| | | | 707/E17.109 |
| 2011/0225192 A1* | 9/2011 | Imig | G06F 16/3325 |
| | | | 707/775 |

* cited by examiner

SUGGESTING QUERIES BASED UPON KEYWORDS

RELATED APPLICATIONS

This application claims priority to and is a continuation of U.S. application Ser. No. 17/851,786, filed on Jun. 28, 2022, entitled "SUGGESTING QUERIES BASED UPON KEYWORDS", which claims priority to and is a continuation of U.S. application Ser. No. 16/448,132, filed on Jun. 21, 2019, entitled "SUGGESTING QUERIES BASED UPON KEYWORDS". U.S. application Ser. No. 17/851,786 and U.S. application Ser. No. 16/448,132 are both incorporated by reference herein in their entirety.

BACKGROUND

Many services, such as websites, applications, etc. may provide platforms for performing searches. For example, a user may interact with a search interface. The user may use the search interface to perform a search based upon a query. The search interface may determine one or more queries related to the query and/or suggest the one or more queries to the user.

SUMMARY

In accordance with the present disclosure, one or more computing devices and/or methods are provided. In an example, a graphical user interface of a first device may be controlled to display a search interface. One or more keywords may be received, via the search interface, from the first device. A plurality of queries associated with the one or more keywords may be determined based upon the one or more keywords and/or a historical query database comprising a plurality of historical queries. A plurality of relationship scores associated with the plurality of queries may be generated based upon a plurality of relationship scores associated with the plurality of historical queries. A first search session of the plurality of search sessions corresponds to one or more searches performed via a second device using one or more queries of the plurality of historical queries. A relationship score of the plurality of relationship scores is associated with a relationship between a query of the plurality of queries and the one or more keywords. The historical query database may be analyzed to determine a plurality of click rates associated with the plurality of queries. A list of suggested queries associated with the one or more keywords may be generated based upon the plurality of queries, the plurality of relationship scores and/or the plurality of click rates.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
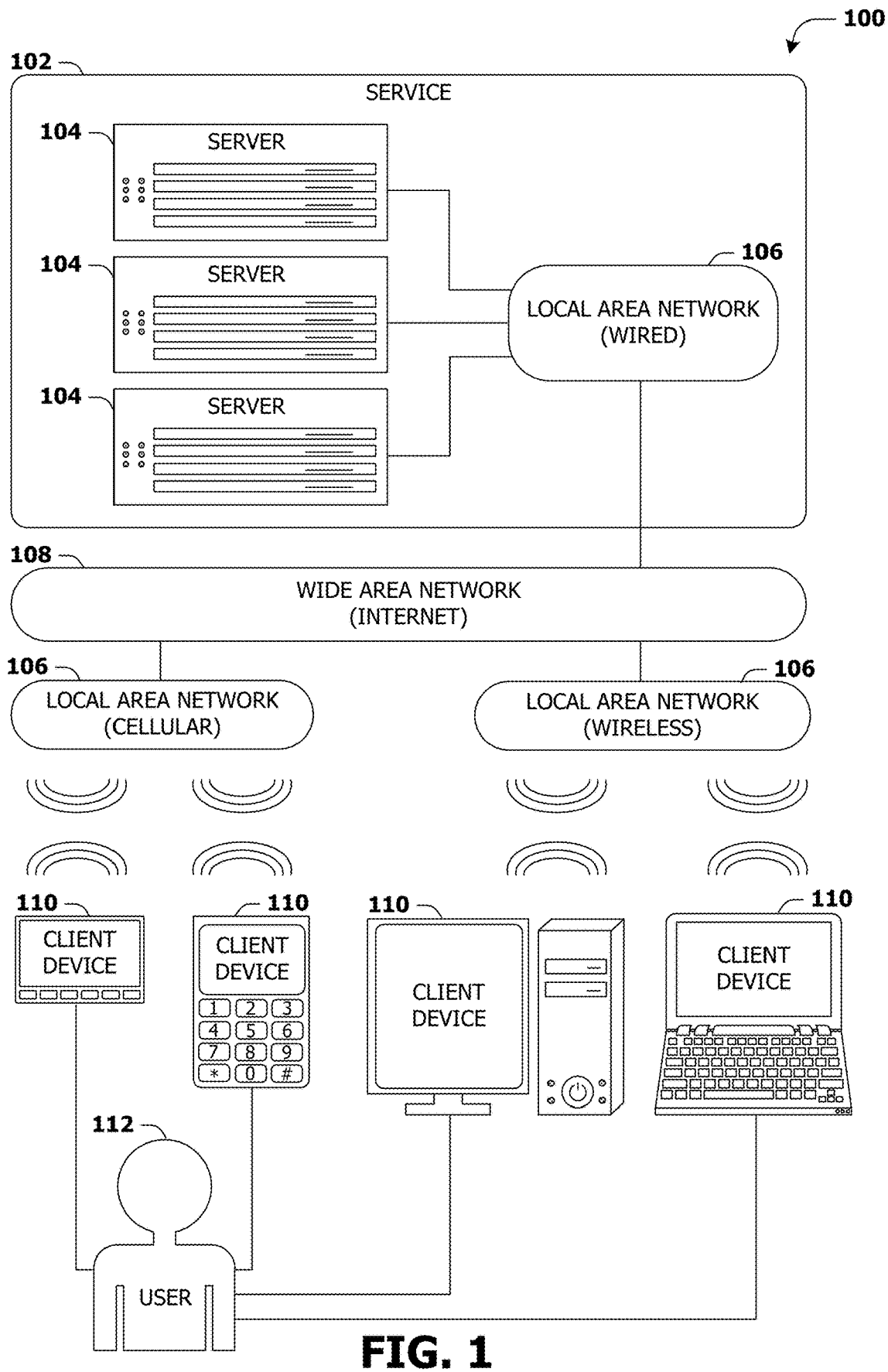
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
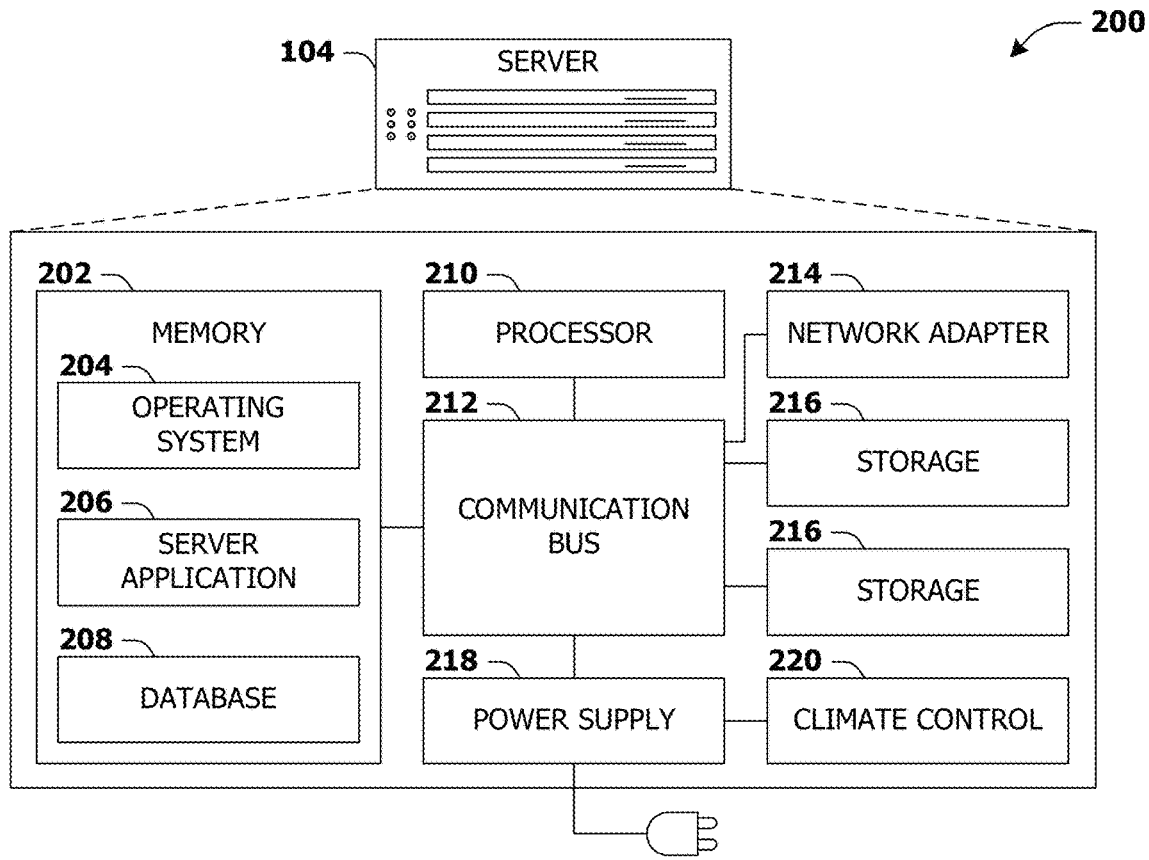
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow.

Many such servers 104 may be configured and/or adapted to utilize at least a portion of the techniques presented herein.

1.3. Client Device Configuration

Figure 3:
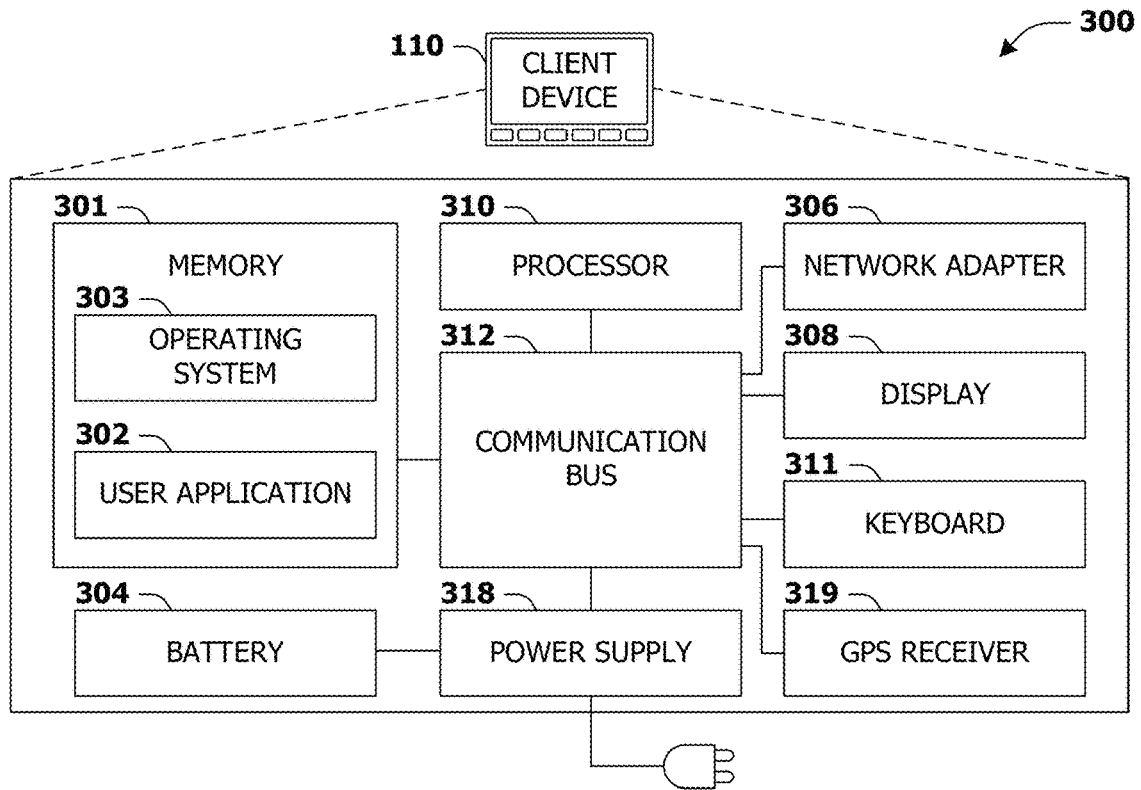
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques are provided for generating a list of suggested queries associated with one or more keywords are provided. For example, a user may access and/or interact with a search interface that generates search results based upon queries. The search interface may be an internal website search interface designed to search for information within a single website. Alternatively and/or additionally, the search interface may be a web search engine designed to search for information throughout the Internet. Alternatively and/or additionally, the search interface may be a shopping search engine designed to search for product information and/or service information within the single website and/or throughout websites of the Internet.

The user may input a first query into the search interface and/or a first plurality of search results may be generated based upon the first query. One or more suggested queries may be determined based upon the first query. The one or more suggested queries may be presented via the search interface. However, the one or more suggested queries may not be associated with informative queries. An informative query may correspond to a query yielding search results that may provide the user with background information associated with a subject of the first query. For example, the subject of the first query may correspond to "smartphone" (e.g., the first query may comprise "smartphone") and/or the background information associated with the subject may correspond to a range of smartphones, average prices of smartphones, a number of vendors of one or more smartphones, popularities of different smartphones, smartphone companies, etc. Rather than determining one or more informative queries associated with the first query, the one or more suggested queries may be determined by predicting, based upon historical queries, one or more final stage queries associated with the first query in order to minimize a search session length associated with the user (e.g., the one or more suggested queries may comprise one or more specific smartphone models and/or products which may not yield search results that provide the user with background information associated with the subject of the first query). As a result of the one or more suggested queries not being associated with informative queries, the user may not interact with the one or more suggested queries and/or the one or more suggested queries may not help the user achieve an understanding of the subject of the first query.

Thus, in accordance with one or more of the techniques presented herein, a plurality of queries associated with the first query may be determined based upon the first query and/or a historical query database. In some examples, a plurality of search sessions of the historical queries and/or a plurality of sequences of queries associated with the plurality of search sessions may be analyzed to generate a plurality of relationship scores associated with the plurality of queries. A list of suggested queries associated with the first query may be generated based upon the plurality of queries and/or the plurality of relationship scores. In some examples, the list of suggested queries may comprise one or more informative queries as a result of the list of suggested queries being generated based upon the plurality of relationship scores which are generated based upon the plurality of search sessions and/or the plurality of sequences of queries. One or more suggested queries of the list of suggested queries may be presented via the search interface. Alternatively and/or additionally, search results may be generated based upon the first query and/or the list of suggested queries. The search results may be presented via the search interface.

Figure 4:
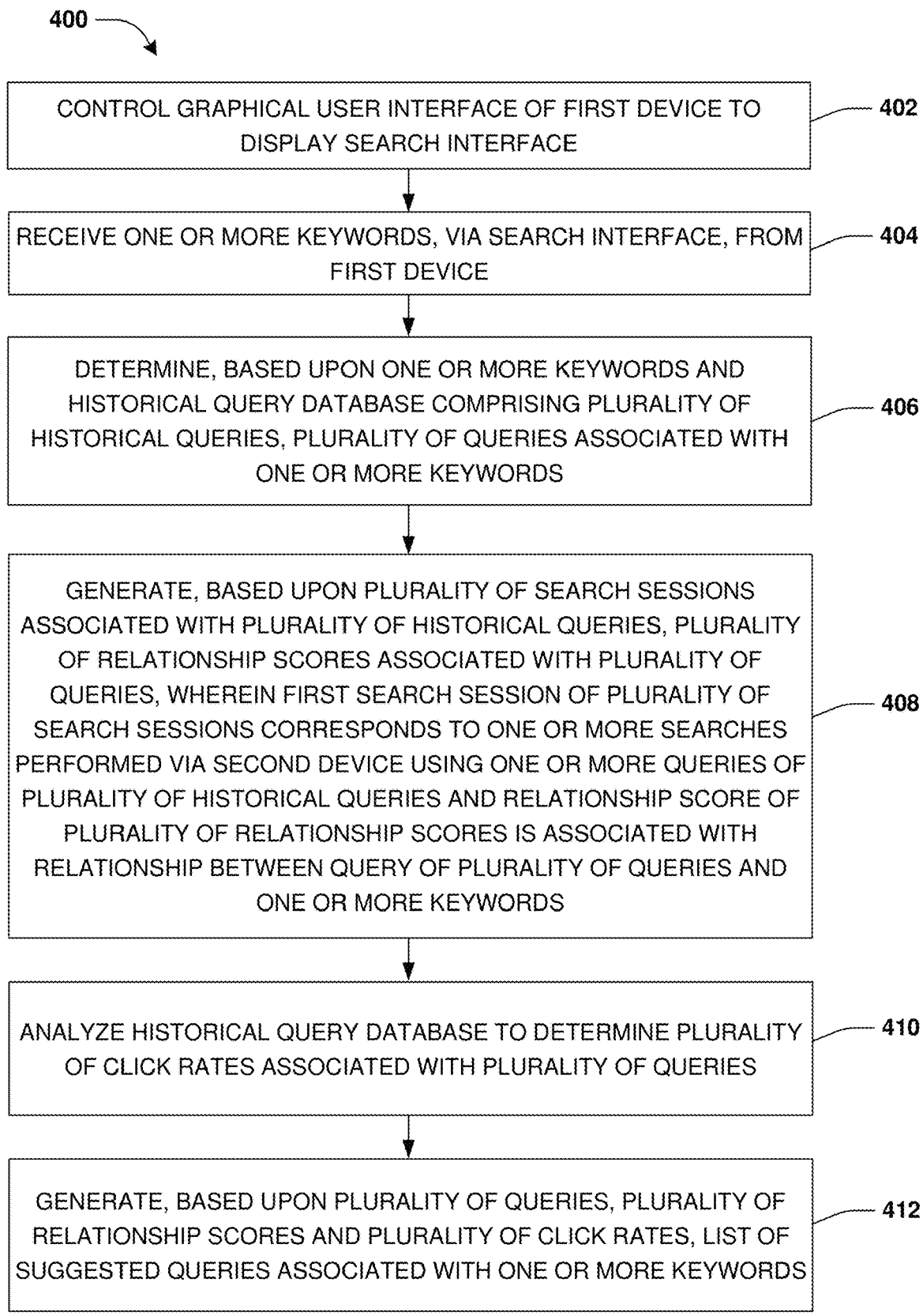
FIG. 4 is a flow chart illustrating an example method for generating a list of suggested queries associated with one or more keywords.

An embodiment of generating a list of suggested queries associated with one or more keywords is illustrated by an example method 400 of FIG. 4. A user, such as user Jill, (and/or a first client device associated with the user), may access and/or interact with a search interface configured for generating search results based upon queries. At 402, a graphical user interface of the first client device may be controlled to display the search interface. In some examples, the search interface may be associated with a first web page accessed via a browser of the first client device. Alternatively and/or additionally, the search interface may be associated with a first application (e.g., a mobile application) accessed via the first client device.

In some examples, the search interface may be a web search engine designed to search for information throughout the Internet. For example, the search interface may be configured to generate search results associated with database entries, websites and/or web pages. Alternatively and/or additionally, the search interface may be an internal website search interface designed to search for information comprised within a defined set of one or more websites, a defined set of one or more web pages and/or a defined set of one or more databases.

In some examples, the search interface may be configured for generating search results associated with one or more types of content. For example, the one or more types of content may correspond to search results associated with product information and/or service information (e.g., the search results may be associated with pages associated with prices, vendors, etc. associated with the sale of products and/or services). Alternatively and/or additionally, the one or more types of content may correspond to search results associated with news information (e.g., the search results may be associated with pages associated with news articles). Alternatively and/or additionally, the one or more types of content may correspond to search results associated with medical information (e.g., the search results may be associated with pages associated with medical information articles). Alternatively and/or additionally, the one or more types of content may correspond to search results associated with legal information (e.g., the search results may be associated with pages associated with legal information). Alternatively and/or additionally, the one or more types of content may correspond to search results associated with job information (e.g., the search results may be associated with pages associated with job postings).

Alternatively and/or additionally, the search interface may be configured for generating search results associated with general content. For example, the search interface may be configured for generating search results associated with one or more of product information, service information, news information, medical information, blog posts, web pages, etc. In some examples, the one or more types of content associated with generating search results using the search interface may be selected and/or modified via a settings interface of the search interface.

At 404, one or more first keywords may be received via the search interface from the first client device. For example, the one or more first keywords may be entered (e.g., input) into a search field of the search interface. For example, the one or more first keywords may comprise a set of characters (e.g., "smartphone", "cars", "J brand cars", "j2 cars", "night dress", etc.). Alternatively and/or additionally, the one or more first keywords may be received via the search interface and/or entered into the search field using a touchscreen (of the first client device), one or more switches (e.g., one or more buttons, such as buttons of a keyboard), a conversational interface (e.g., a voice recognition and natural language interface), etc.

In some examples, the search interface may comprise a search selectable input corresponding to performing a search based upon the one or more first keywords. For example, the one or more first keywords may correspond to a first query. A selection of the search selectable input may cause the search to be performed. In some examples, a first plurality of search results associated with the one or more first keywords may be generated and/or presented via the search interface.

At 406, a first plurality of queries associated with the one or more first keywords may be determined based upon the one or more first keywords and/or a historical query database. In some examples, the historical query database may comprise a plurality of historical queries comprising the first plurality of queries. In some examples, the historical query database may comprise timestamps associated with queries of the plurality of historical queries (e.g., the timestamps may correspond to times that queries of the plurality of historical queries are received and/or times that searches are performed using the queries) and/or indications of client devices associated with queries of the plurality of historical queries (e.g., the indications of client devices may correspond to client device identifiers associated with client devices from which queries of the plurality of historical queries are received).

In some examples, queries of the plurality of historical queries may be selected for inclusion in the first plurality of queries based upon a determination that the queries are associated with the one or more first keywords. Alternatively and/or additionally, merely historical queries of the historical query database received within a duration of time prior to a current time may be analyzed to determine the first plurality of queries (e.g., merely historical queries received within a year, a month and/or a week prior to the current time may be analyzed to determine the plurality of queries).

In some examples, an exemplary query of the plurality of historical queries may be selected for inclusion in the first plurality of queries associated with the one or more first keywords based upon a determination that one or more characters and/or one or more keywords of the exemplary query match and/or are related to the one or more first keywords. For example, it may be determined that the one or more characters and/or the one or more keywords of the exemplary query match and/or are related to the one or more first keywords if a portion of the exemplary query is the same as at least a portion of the one or more first keywords. In an example where the one or more first keywords comprises "car" and/or the exemplary query comprises "offroad cars", it may be determined that the one or more characters and/or the one or more keywords of the exemplary query match and/or are related to the one or more first keywords based upon both the one or more first keywords and/or the exemplary query comprising "car".

Alternatively and/or additionally, it may be determined that the one or more characters and/or the one or more keywords of the exemplary query match and/or are related to the one or more first keywords if at least a portion of the exemplary query is associated with a topic and/or a search category associated with at least a portion of the one or more first keywords. In an example where the one or more first keywords comprises "car" and/or the exemplary query comprises a car brand, it may be determined that the one or more characters and/or the one or more keywords of the exemplary query match and/or are related to the one or more first keywords based upon the one or more first keywords and/or the exemplary query being associated with a topic and/or a search category (e.g., "cars").

Alternatively and/or additionally, it may be determined that the one or more characters and/or the one or more keywords of the exemplary query match and/or are related to the one or more first keywords if at least a portion of the exemplary query is associated with a definition and/or a meaning related to at least a portion of the one or more first keywords. In an example where the one or more first keywords comprises "phones" and/or the exemplary query comprises "smartphone", it may be determined that the one or more characters and/or the one or more keywords of the exemplary query match and/or are related to the one or more first keywords based upon the one or more first keywords and/or the exemplary query being associated with similar definitions and/or meanings.

In some examples, the exemplary query may be associated with an exemplary search session. For example, the exemplary search session may correspond to searches performed via an exemplary client device using the exemplary query and/or one or more second exemplary queries. In some examples, the historical query database may be indicative of the exemplary search session. Alternatively and/or additionally, timestamps and/or indications of client devices associated with historical queries of the historical query database may be analyzed to determine the exemplary search session. The exemplary search session may correspond to searches that are performed by the exemplary client device within a period of time. The searches associated with the exemplary search session may be performed using an exemplary search interface of the exemplary client device. Alternatively and/or additionally, the searches associated with the exemplary search session may be related to a single topic. For example, the exemplary search session may correspond to searches performed using the exemplary client device within a 30-minute time period (and/or a different time period), wherein the searches may be related to cars (and/or a different topic).

The one or more second exemplary queries may be selected for inclusion in the first plurality of queries associated with the one or more first keywords based upon a determination that the exemplary query and the one or more second exemplary queries are associated with the first search session (e.g., searches performed using the exemplary query and the one or more second exemplary queries may be performed in the first search session).

At 408, a plurality of relationship scores associated with the first plurality of queries may be generated based upon a plurality of search sessions associated with the plurality of historical queries. In some examples, a relationship score of the plurality of relationship scores may be associated with a relationship between a query of the first plurality of queries and the one or more first keywords. For example, a relationship score of the plurality of relationship scores may be associated with a level of relevance of a query of the first plurality of queries to the one or more first keywords. Alternatively and/or additionally, a relationship score of the plurality of relationship scores may be associated with a probability that the user associated with the first client device is interested in a query of the first plurality of queries and/or a probability that the user will select the query of the first plurality of queries.

In some examples, the plurality of search sessions may comprise a first search session associated with a second client device. The first search session may correspond to one or more first searches performed via the second client device using one or more first queries of the plurality of historical queries. For example, a second query of the one or more first queries associated with the first search session may be received from the second client device during the first search session at a first time (e.g., a first search of the one or more first searches may be performed responsive to receiving the second query). Alternatively and/or additionally, a third query of the one or more first queries may be received from the second client device during the first search session at a second time, after the first time (e.g., a second search of the one or more first searches may be performed responsive to receiving the third query).

In some examples, a first sequence of queries associated with the first search session may be determined based upon the second query and/or the third query (and/or one or more other queries of the one or more first queries). In some examples, the first sequence of queries may be indicative of one or more timing characteristics associated with the one or more first searches. For example, the first sequence of queries may be indicative of the third query being received after the second query is received (and/or the first sequence of queries may be indicative of the second search being performed using the third query after the first search is performed using the second query).

In some examples, the plurality of relationship scores may be generated based upon a plurality of sequences of queries associated with the plurality of search sessions. The plurality of sequences of queries may be determined based upon the historical query database (e.g., the historical query database may be analyzed to determine the plurality of sequences of queries). For example, the plurality of sequences of queries may comprise the first sequence of queries. Alternatively and/or additionally, timestamps and/or indications of client devices associated with historical queries of the historical query database may be analyzed to determine the plurality of sequences of queries. In some examples, the historical query database may comprise and/or may be indicative of the plurality of sequences of queries. In some examples, the plurality of sequences of queries may be indicative of queries received during the plurality of search sessions and/or search categories associated with the queries. For example, the first sequence of queries may be indicative of the second query, a first search category associated with the second query, the third query and/or a second search category associated with the third query. In some examples, the plurality of relationship scores may be generated merely based upon search sessions and/or sequences of queries that occur within the duration of time prior to the current time.

In an example, the second query may be associated with a name of a home appliance brand (e.g., "JTX") and/or the first search category may be associated with home appliances (e.g., "home appliances"). Alternatively and/or additionally, the third query may be associated with a phone model associated with the home appliance brand (e.g., "JTX 2 phone") and/or the second search category may be associated with phones, which may be a subcategory of home appliances (e.g., "home appliances—phones"). In some examples, the first sequence of queries may comprise "JTX *Home appliances, JTX 2 phone *Home appliances—phones"). Alternatively and/or additionally, the first sequence of queries may be indicative of a last and/or most specific subcategory and/or category of a query. For example, the first sequence of queries may comprise "JTX *Home appliances, JTX 2 phone *phones").

In some examples, an exemplary relationship score associated with an exemplary query of the first plurality of queries may be generated based upon a quantity of instances that a search associated with the exemplary query was performed (e.g., a quantity of search sessions where a query associated with and/or matching the exemplary query was received). Alternatively and/or additionally, the exemplary relationship score associated with the exemplary query of the first plurality of queries may be generated based upon a quantity of sequences of queries comprising a query associated with and/or matching the exemplary query.

Alternatively and/or additionally, a fourth query of the one or more first queries may be received from the second client device during the first search session at a third time, after the second time (e.g., a third search of the one or more first searches may be performed responsive to receiving the fourth query). In some examples, the first sequence of queries may be indicative of the fourth query being received after the third query is received. Alternatively and/or additionally, the first sequence of queries may be indicative of one or more query sequence pairs. For example, a query sequence pair of the one or more query sequence pairs may correspond to two queries of the first sequence of queries.

For example, a query sequence pair of the one or more query sequence pairs may correspond to two consecutively received queries. A first query sequence pair of the one or more query sequence pairs may correspond to the second query and/or the third query. In some examples, the first query sequence pair may be indicative of the second query, the first search category associated with the second query, the third query and/or the second search category associated with the third query.

Alternatively and/or additionally, a second query sequence pair of the one or more query sequence pairs may correspond to the third query and the fourth query. In some examples, the second query and/or the fourth query may not correspond to a query sequence pair as a result of the second query being received between reception of the second query and the fourth query.

Alternatively and/or additionally, a query sequence pair of the one or more query sequence pairs may correspond to two received queries of a sequence of queries, regardless of whether a different query is received between reception of the two received queries. For example, a third query sequence pair of the one or more query sequence pairs may correspond to the second query and the fourth query.

In some examples, the plurality of relationship scores may be generated based upon a plurality of query sequence pairs associated with the plurality of sequences of queries. For example, the plurality of query sequence pairs may comprise the query sequence pair, the second query sequence pair and/or the third query sequence pair. In some examples, the exemplary relationship score associated with the exemplary query of the first plurality of queries may be generated based upon a quantity of query sequence pairs comprising a query associated with and/or matching the one or more first keywords and/or comprising a query associated with and/or matching the exemplary query. For example, a query sequence pair that comprises a query associated with and/or matching the one or more first keywords and comprises a query associated with and/or matching the exemplary query may be indicative of a search associated with the exemplary query being performed in a same search session that a search associated with the one or more first keywords is performed. Accordingly, it may be determined based upon the query sequence pair that the exemplary query is related to and/or relevant to the one or more first keywords.

Alternatively and/or additionally, positions of queries in a query sequence pair may be analyzed to generate the exemplary relationship score associated with the exemplary query. For example, a query sequence pair that comprises an initial query associated with and/or matching the one or more first keywords and comprises a next query associated with and/or matching the exemplary query may be indicative of a search associated with the exemplary query being performed after and/or directly after a search associated with the one or more first keywords is performed (where the initial query is in a first position (e.g., initial position) of the query sequence pair and the next query is in a second position (e.g., after the initial position) of the query sequence pair which may be indicative of the initial query being received prior to the next query being received). Accordingly, it may be determined based upon the query sequence pair that the exemplary query is a follow up query to the one or more first keywords. In some examples, the exemplary relationship score associated with the exemplary query may be generated based upon a quantity of query sequence pairs indicative of the exemplary query (and/or a query associated with and/or matching the exemplary query) being a follow up query to the one or more first keywords (and/or a query associated with and/or matching the one or more first keywords).

In some examples, the exemplary relationship score of the exemplary query of the first plurality of queries may be indicative of a first probability that the user associated with the first client device (and/or a different user that performs a search associated with the one or more first keywords) is interested in the exemplary query and/or a second probability that the user will select the exemplary query if the exemplary query is presented (e.g., suggested to the user). In some examples, the first probability and/or the second probability may be determined based upon one or more first query parameters associated with the exemplary query. For example, the one or more first query parameters may comprise the quantity of instances that a search associated with the exemplary query was performed, the quantity of sequences of queries comprising a query associated with and/or matching the exemplary query, the quantity of query sequence pairs comprising a query associated with and/or matching the one or more first keywords and/or comprising a query associated with and/or matching the exemplary query and/or the quantity of query sequence pairs indicative of the exemplary query (and/or a query associated with and/or matching the exemplary query) being a follow up query to the one or more first keywords (and/or a query associated with and/or matching the one or more first keywords).

Alternatively and/or additionally, the first probability and/or the second probability (and/or the first relationship score) may be determined based upon a comparison of the one or more first query parameters with query parameters associated with other queries of the first plurality of queries. For example, one or more operations (e.g., mathematical operations) may be performed using the one or more first query parameters and/or the query parameters associated with the other queries of the first plurality of queries to determine the first probability and/or the second probability (and/or the first relationship score).

In some examples, the plurality of relationship scores may be compared with a threshold relationship score. For example, responsive to a determination that the exemplary relationship score does not meet the threshold relationship score, the exemplary query may be removed from (and/or may not be included in) the first plurality of queries.

In some examples, the plurality of relationship scores may be generated using a machine learning model. The machine learning model may have an encoder decoder architecture (e.g., a sequence-to-sequence (Seq2Seq) architecture) and/or a different machine learning architecture. In some examples, the machine learning model may be trained using the plurality of sequences of queries associated with the plurality of search sessions. A first plurality of representations (e.g., one or more of vector representations, embeddings, word embeddings, etc.) may be generated based upon the plurality of sequences of queries (and/or a second plurality of sequences of queries of the historical query database associated with search sessions different than the plurality of search sessions). For example, a representation of the first plurality of representations may be generated based upon a sequence of queries of the plurality of sequences of queries. In some examples, the first plurality of representations may correspond to numerical representations of the plurality of sequences of queries (e.g., a representation of the first plurality of representations may be a numerical representation and/or a numerical embedding of a sequence of queries of the plurality of sequences of queries).

In an example, a first exemplary representation of the first plurality of representations may be generated based upon an exemplary sequence of queries of the plurality of sequences of queries. In some examples, the first exemplary representation may be indicative of exemplary queries associated with the exemplary sequence of queries. Alternatively and/or additionally, the first exemplary representation may be indicative of one or more timing characteristics and/or a temporal sequence of queries associated with the exemplary sequence of queries. Alternatively and/or additionally, the first exemplary representation may be indicative of one or more search categories associated with the exemplary queries associated with the exemplary sequence of queries.

In some examples, the first plurality of representations may be generated using one or more word2vec techniques. For example, a representation of the first plurality of representations (and/or each representation of the first plurality of representations) may be generated using the one or more word2vec techniques. Alternatively and/or additionally, a representation of the first plurality of representations (and/or each representation of the first plurality of representations) may correspond to a word2vec embedding (e.g., a numerical representation) associated with a sequence of queries of the plurality of sequences of queries. It may be appreciated that word2vec is an exemplary algorithm configured to receive as input a corpus of text and generate vectors and/or numerical representations. While word2vec may be mentioned herein, one or more other algorithms similarly configured to receive as input a corpus of text and generate vectors and/or numerical representations may be used instead (and/or in addition), and are contemplated.

Alternatively and/or additionally, the machine learning model may be trained using the plurality of query sequence pairs associated with the plurality of sequences of queries. A second plurality of representations (e.g., one or more of vector representations, embeddings, word embeddings, etc.) may be generated based upon the plurality of query sequence pairs (and/or a second plurality of query sequence pairs of the historical query database associated with search sessions different than the plurality of search sessions). For example, a representation of the second plurality of representations may be generated based upon a query sequence pair of the plurality of query sequence pairs. In some examples, the second plurality of representations may correspond to numerical representations of the plurality of query sequence pairs (e.g., a representation of the second plurality of representations may be a numerical representation and/or a numerical embedding of a query sequence pair of the plurality of query sequence pairs).

In an example, a second exemplary representation of the second plurality of representations may be generated based upon an exemplary query sequence pair of the plurality of query sequence pairs. In some examples, the second exemplary representation may be indicative of exemplary queries associated with the exemplary query sequence pair. Alternatively and/or additionally, the second exemplary representation may be indicative of one or more timing characteristics associated with the exemplary query sequence pair. Alternatively and/or additionally, the second exemplary representation may be indicative of one or more search categories associated with the exemplary queries associated with the exemplary query sequence pairs.

In some examples, the second plurality of representations may be generated using the one or more word2vec techniques. For example, a representation of the second plurality of representations (and/or each representation of the second plurality of representations) may be generated using the one or more word2vec techniques. Alternatively and/or additionally, a representation of the second plurality of representations (and/or each representation of the second plurality of representations) may correspond to a word2vec embedding (e.g., a numerical representation) associated with a query sequence pair of the plurality of query sequence pairs.

In some examples, the machine learning model may be trained using the first plurality of representations (associated with the plurality of sequences of queries) and/or the second plurality of representations (associated with the plurality of query sequence pairs). Alternatively and/or additionally, the first plurality of representations and/or the second plurality of representations may be input to the machine learning model to determine the first plurality of queries and/or generate the plurality of relationship scores using the first plurality of representations and/or the second plurality of representations.

In some examples, the machine learning model may use one or more recurrent neural networks (RNNs) to process the one or more first keywords and/or one or more queries received via the search interface from the first client device during a search session within which the one or more first keywords are received. Alternatively and/or additionally, the machine learning model may determine the first plurality of queries and/or generate the plurality of relationship scores based upon the historical query database, the first plurality of representations (associated with the plurality of sequences of queries) and/or the second plurality of representations (associated with the plurality of query sequence pairs).

In some examples, the machine learning model may convert an input sequence into an output sequence. Alternatively and/or additionally, the input sequence and/or the output sequence may have arbitrary lengths. For example, a character length and/or a sequence length of the input sequence may be different than a character length and/or a sequence length of the output sequence. In some examples, the input sequence may correspond to the one or more first keywords and/or the one or more queries received via the search interface from the first client device.

Alternatively and/or additionally, the machine learning model may be associated with one or more long short-term memory (LSTM) layers and/or one or more states associated with the one or more LSTM layers. In some examples, one or more representations (e.g., one or more of one or more vector representations, one or more numerical representations, one or more embeddings, one or more word embeddings, etc.) may be generated by a state (e.g., a last state) of the one or more states associated with the one or more LSTM layers, based upon the input sequence. Alternatively and/or additionally, the machine learning model may be associated with one or more encoder LSTM states associated with LSTM states of an encoder of the machine learning model and/or one or more decoder LSTM states associated with LSTM states of a decoder of the machine learning model. For example, the decoder may initialize the one or more decoder LSTM states based upon the one or more encoder LSTM states.

In some examples, the one or more representations may be compared with the first plurality of representations (associated with the plurality of sequences of queries) and/or the second plurality of representations (associated with the plurality of query sequence pairs) to determine relationships between the one or more representations and representations of the first plurality of representations and/or the second plurality of representations. Alternatively and/or additionally, the one or more representations may be compared with the first plurality of representations and/or the second plurality of representations to generate the plurality of relationship scores.

In some examples, the plurality of relationship scores may be normalized into a probability distribution associated with a plurality of probabilities associated with the first plurality of queries. For example, a probability of the plurality of probabilities associated with a query of the first plurality of queries may be indicative of a probability that the user associated with the first client device is interested in the query. Alternatively and/or additionally, a probability of the plurality of probabilities associated with a query of the first plurality of queries may be indicative of a probability that the user associated with the first client device will select the query if the query is presented (e.g., suggested to the user). For example, the plurality of probabilities may add up to 1 (and/or 100%). Alternatively and/or additionally, the plurality of probabilities may be compared with a threshold probability. For example, responsive to a determination that a probability of the plurality of probabilities does not meet the threshold probability, a query associated with the probability may be removed from (and/or may not be included in) the first plurality of queries. In some examples, the plurality of relationship scores may be normalized into the probability distribution associated with the plurality of probabilities using a softmax function (e.g., a normalized exponential function).

In some examples, the first plurality of queries may comprise a first plurality of sets of queries. A first set of queries of the first plurality of sets of queries may be determined based upon the one or more first keywords and/or the one or more queries received via the search interface from the first client device (e.g., the first set of queries may be determined using the machine learning model). For example, the first set of queries may be associated with and/or may yield search results providing information associated with the one or more first keywords (e.g., if the one or more first keywords comprises "cars", the first set of queries may be associated with one or more car brands). In some examples, the first set of queries may be associated with a first set of probabilities (of the plurality of probabilities) that meet the probability threshold (e.g., queries that are associated with probabilities that do not meet the probability threshold may be removed from the first set of queries and/or may not be included in the first set of queries). Alternatively and/or additionally, the first set of queries may be associated with a first set of quantities (e.g., quantities of searches performed using queries of the first set of queries) that meet a quantity threshold (e.g., each query of the first set of queries may be associated with a quantity of searches performed within the duration of time prior to the current time using the query that meets the quantity threshold).

In some examples, one or more first sets of queries of the first plurality of sets of queries may be determined based upon the first set of queries. Alternatively and/or additionally, for each query of the first set of queries, a set of queries may be determined. For example, a second set of queries of the one or more first sets of queries may be determined based upon the one or more first keywords, the one or more queries received via the search interface from the first client device and/or a fifth query of the first set of queries. For example, the second set of queries may be associated with and/or may yield search results providing information associated with the fifth query (e.g., if the fifth query comprises a first car brand, the second set of queries may be associated with one or more car models of the first car brand). In some examples, the second set of queries may be associated with a second set of probabilities (of the plurality of probabilities) that meet the probability threshold (e.g., queries that are associated with probabilities that do not meet the probability threshold may be removed from the second set of queries and/or may not be included in the second set of queries). Alternatively and/or additionally, the second set of queries may be associated with a second set of quantities (e.g., quantities of searches performed using queries of the second set of queries) that meet the quantity threshold (e.g., each query of the second set of queries may be associated with a quantity of searches performed within the duration of time prior to the current time using the query that meets the quantity threshold).

Alternatively and/or additionally, a third set of queries of the one or more first sets of queries may be determined (by the machine learning model) based upon the one or more first keywords, the one or more queries received via the search interface from the first client device and/or a sixth query of the first set of queries. For example, the third set of queries may be associated with and/or may yield search results providing information associated with the sixth query (e.g., if the sixth query comprises a second car brand, the third set of queries may be associated with one or more car models of the second car brand). In some examples, the third set of queries may be associated with a third set of probabilities (of the plurality of probabilities) that meet the probability threshold (e.g., queries that are associated with probabilities that do not meet the probability threshold may be removed from the third set of queries and/or may not be included in the third set of queries). Alternatively and/or additionally, the third set of queries may be associated with a third set of quantities (e.g., quantities of searches performed using queries of the second set of queries) that meet the quantity threshold (e.g., each query of the third set of queries may be associated with a quantity of searches performed within the duration of time prior to the current time using the query that meets the quantity threshold).

Alternatively and/or additionally, one or more second sets of queries may be determined based upon the second set of queries. For example, a fourth set of queries of the one or more second sets of queries may be determined based upon a sixth query of the second set of queries. Alternatively and/or additionally, one or more third sets of queries may be determined based upon the third set of queries. For example, a fifth set of queries of the one or more third sets of queries may be determined based upon a seventh query of the third set of queries.

In some examples, a first query path may be determined based upon the first plurality of sets of queries. For example, the first query path may correspond to the fifth query of the first set of queries, the second set of queries associated with the fifth query and/or the one or more second sets of queries associated with the second set of queries. For example, the fifth query may correspond to a first step of the first query path, the second set of queries may correspond to a second step of the first query path, the one or more second sets of queries may correspond to a third step of the first query path, etc.

Alternatively and/or additionally, a second query path may be determined based upon the first plurality of sets of queries. For example, the second query path may correspond to the sixth query of the first set of queries, the third set of queries associated with the sixth query and/or the one or more third sets of queries associated with the third set of queries. For example, the sixth query may correspond to a first step of the second query path, the third set of queries may correspond to a second step of the second query path, the one or more third sets of queries may correspond to a third step of the second query path, etc. In some examples, the first query path and/or the second query path may be determined using the machine learning model. Alternatively and/or additionally, one or more other query paths may be determined based upon one or more other queries of the first set of queries.

At 410, the historical query database may be analyzed to determine a plurality of click rates (e.g., click-through rates (CTRs)) associated with the first plurality of queries. An exemplary click rate, of the plurality of click rates, associated with an exemplary query may correspond to a proportion (e.g., a percentage) of searches associated with the exemplary query leading to a selection of a search result (and/or a link associated with the search result) generated based upon the exemplary query. For example, the exemplary click rate may be determined based upon a total quantity of searches of a plurality of searches associated with the exemplary query and/or a quantity of searches of a second plurality of searches (of the plurality of searches) associated with a selection of a search result generated based upon the exemplary query. For example, one or more operations (e.g., mathematical operations) may be performed using the total quantity of searches and/or the quantity of searches to determine the exemplary click rate.

In some examples, the plurality of relationship scores may be generated based upon the plurality of click rates. For example, a first plurality of weights may be generated based upon the plurality of click rates. For example, the first plurality of weights may be assigned to the first plurality of queries. Alternatively and/or additionally, the plurality of relationship scores may be generated based upon the first plurality of weights. In some examples, a query with a higher weight of the first plurality of weights may be assigned a higher relationship score as compared with a query with a lower weight of the first plurality of weights. In some examples, the plurality of click rates and/or the first plurality of weights may be input to the machine learning model for generating the plurality of relationship scores. Alternatively and/or additionally, the machine learning model may be trained using the plurality of click rates and/or the first plurality of weights.

Alternatively and/or additionally, the historical query database may be analyzed to determine a second plurality of click rates associated with the plurality of query sequence pairs associated with the plurality of sequences of queries. For example, a click rate associated with an exemplary query sequence pair of the plurality of query sequence pairs may be determined. In some examples, a second plurality of weights may be generated based upon the second plurality of click rates. For example, the second plurality of weights may be assigned to the plurality of query sequence pairs. In some examples, the plurality of relationship scores may be generated based upon the second plurality of click rates and/or the second plurality of weights. In some examples, a query associated with a query sequence pair with a higher weight of the second plurality of weights may be assigned a higher relationship score as compared with a query associated with a query sequence pair with a lower weight of the second plurality of weights. In some examples, the second plurality of click rates and/or the second plurality of weights may be input to the machine learning model for generating the plurality of relationship scores. Alternatively and/or additionally, the machine learning model may be trained using the second plurality of click rates and/or the second plurality of weights.

In an example, the second query of the first query sequence pair (corresponding to the second query and the third query) may be associated with two selections, performed via the second client device, of search results generated based upon the second query and/or the third query of the first query sequence pair may be associated with one selection of a search result generated based upon the third query. Alternatively and/or additionally, the fourth query of the second sequence pair (corresponding to the third query and the fourth query) may be associated with four selections of search results generated based upon the fourth query. Accordingly, a first quantity of selections associated with the first query sequence pair may be three selections and/or a second quantity of selections associated with the second query sequence pair may be five selections. Thus, a first click rate and/or a first weight associated with the first query sequence pair may be less than a second click rate and/or a second weight associated with the second query sequence pair.

In some examples, a plurality of search frequencies associated with the first plurality of queries may be determined. In some examples, a search frequency of the plurality of search frequencies may correspond to a rate per duration of time at which a query of the first plurality of queries is used to perform a search (e.g., the duration of time may correspond to one or more of an hour, a day, a week, a month, etc. and/or a different duration of time). In some examples, a plurality of search frequency weights may be generated based upon the plurality of search frequencies. For example, the plurality of search frequency weights may be assigned to the first plurality of queries. In some examples, the plurality of relationship scores may be generated based upon the plurality of search frequencies and/or the plurality of search frequency weights. In some examples, a query with a higher search frequency weight (and/or a higher search frequency) may be assigned a higher relationship score as compared with a query with a lower search frequency weight (and/or a lower search frequency).

In some examples, queries associated with search frequencies lower than a threshold search frequency may not be included in the first plurality of queries and/or may be removed from the first plurality of queries. Alternatively and/or additionally, the plurality of sequences of queries may be modified based upon the plurality of search frequencies. For example, queries associated with search frequencies lower than the threshold search frequency may not be included in and/or may be removed from the plurality of sequences of queries. Alternatively and/or additionally, query pairs of the plurality of query sequence pairs may be determined based upon a version of the plurality of sequences of queries without the queries associated with the search frequencies lower than the threshold search frequency. Thus, the plurality of query sequence pairs may not comprise (and/or may comprise) the queries associated with the search frequencies lower than the threshold search frequency.

At 412, a first list of suggested queries associated with the one or more first keywords may be generated based upon the first plurality of queries, the plurality of relationship scores, the plurality of click rates, the second plurality of click rates, the plurality of search frequencies, the plurality of sequences of queries and/or the plurality of query sequence pairs. In some examples, the first list of suggested queries may be generated and/or output by the machine learning model.

For example, the first plurality of queries may be ranked based upon the first plurality of queries, the plurality of relationship scores, the plurality of click rates, the second plurality of click rates, the plurality of search frequencies, the plurality of sequences of queries and/or the plurality of query sequence pairs to generate a plurality of rankings associated with the first plurality of queries. In some examples, the first list of suggested queries may be generated based upon the plurality of rankings. For example, the first list of suggested queries may be arranged (e.g., organized) based upon the plurality of rankings. For example, a first exemplary suggested query of the first list of suggested queries may be above a second exemplary query of the first list of suggested queries based upon a first exemplary ranking of the first exemplary query being higher than a second exemplary ranking of the second exemplary query.

It may be appreciated that by ranking the first plurality of queries based upon the first plurality of queries, the plurality of relationship scores, the plurality of click rates, the second plurality of click rates, the plurality of search frequencies, the plurality of sequences of queries and/or the plurality of query sequence pairs to generate the plurality of rankings, informative queries may be ranked higher than other queries of the first plurality of queries. In some examples, the informative queries may correspond to queries that may yield search results that may provide the user associated with the first client device with background information associated with a subject associated with the one or more first keywords.

In some examples, the one or more first keywords may be modified based upon the first list of suggested queries. For example, the one or more first keywords may be compared with the first list of suggested queries to determine whether the one or more first keywords comprise one or more of a misspelling, a misused word, etc. For example, responsive to a determination that the one or more first keywords comprises a misspelling and/or a misused word, the one or more first keywords may be modified to a modified version of the one or more first keywords automatically and/or the first plurality of search results may be generated based upon the modified version of the one or more first keywords (rather than the one or more first keywords). For example, the modified version of the one or more first keywords may be determined based upon a suggested query of the first list of suggested queries that is similar in meaning and/or spelling to the one or more first keywords. Alternatively and/or additionally, responsive to a determination that the one or more first keywords comprises a misspelling and/or a misused word, the modified version of the one or more first keywords may be presented via the search interface. For example, responsive to a selection of the modified version of the one or more first keywords, the first plurality of search results may be generated based upon the modified version of the one or more first keywords.

In some examples, one or more first suggested queries of the first list of suggested queries may be presented via the search interface. In some examples, responsive to receiving a selection of a suggested query of the one or more first suggested queries via the search interface, a search associated with the suggested query may be performed to generate and/or present a second plurality of search results associated with the suggested query.

For example, the one or more first suggested queries of the first list of suggested queries may be presented via the search interface based upon the plurality of rankings. For example, the one or more first suggested queries of the first list of suggested queries may be selected for presentation via the search interface based upon a determination that the one or more first suggested queries are associated with one or more first rankings that meet (and/or are above) a rank threshold. For example, the one or more first rankings may meet the rank threshold based upon the one or more first rankings being above the rank threshold. Alternatively and/or additionally, the one or more first rankings may meet the rank threshold based upon the one or more first rankings being higher than other rankings of the plurality of rankings. For example, the one or more first suggested queries of the first list of suggested queries may be selected for presentation via the search interface responsive to a determination that the one or more first suggested queries are associated with the highest rankings of the plurality of rankings. For example, if the rank threshold is associated with five highest ranked queries, the one or more first suggested queries may comprise five suggested queries of the first list of suggested queries associated with rankings that are higher than other rankings of the plurality of rankings.

In some examples, the one or more first suggested queries of the first list of suggested queries may be presented adjacent to the search field (and/or at a different location) of the search interface. Alternatively and/or additionally, the one or more first suggested queries of the first list of suggested queries may be may be presented while the one or more first keywords are input into the search field of the search interface and/or after the one or more first keywords are input into the search field. For example, a recommended search list (e.g., such as a query prediction list and/or an auto-complete list) comprising the one or more first suggested queries may be presented adjacent to the search field (and/or at a different location of the search interface).

Alternatively and/or additionally, the one or more first suggested queries of the first list of suggested queries may be presented responsive to the first plurality of search results associated with the one or more first keywords being generated (based upon the one or more first keywords and/or the first query comprising the one or more first keywords) and/or presented via the search interface. For example, the one or more first suggested queries of the first list of suggested queries may be presented responsive to receiving the selection of the search selectable input corresponding to performing a search based upon the one or more first keywords. For example, the one or more first suggested queries of the first list of suggested queries may be presented adjacent to the search field and/or adjacent to the first plurality of search results associated with the one or more first keywords (and/or at a different location of the search interface).

Alternatively and/or additionally, after the first plurality of search results are generated and/or presented via the search interface, the one or more first suggested queries of the first list of suggested queries may be presented. For example, responsive to receiving the selection of the search selectable input, the search interface may present the search field and/or the first plurality of search results. In some examples, the one or more first suggested queries may be presented responsive to receiving a selection of the search field of the search interface. For example, responsive to receiving the selection of the search field of the search interface, the recommended search list comprising the one or more first suggested queries may be presented adjacent to the search field (and/or at a different location of the search interface). Alternatively and/or additionally, responsive to detecting one or more characters being input into the search field, the recommended search list comprising the one or more first suggested queries may be presented adjacent to the search field (and/or at a different location of the search interface).

Alternatively and/or additionally, the first plurality of search results may be generated based upon the one or more first keywords, the first list of suggested queries and/or the one or more first suggested queries. For example, the first plurality of search results may be arranged (e.g., organized) based upon the first list of suggested queries and/or the one or more first suggested queries. For example, a search result associated with a query of the one or more first suggested queries may be presented above (e.g., preceding and/or higher up in the first plurality of search results) a search result that is not associated with the one or more first suggested queries.

Alternatively and/or additionally, a first set of search results may be generated based upon the one or more first keywords and/or a second set of search results may be generated based upon the one or more first suggested queries (and/or one or more queries of the first list of suggested queries). For example, the first plurality of search results may be generated based upon the first set of search results and/or the second set of search results. For example, the first plurality of search results may comprise the first set of search results and/or the second set of search results. It may be appreciated that by generating and/or arranging the first plurality of search results based upon the one or more first suggested queries, the first plurality of search results may comprise more informative search results and/or the informative search results may be more easily accessible to the user (e.g., the informative search results may be presented higher up in the first plurality of search results such that the user may not be required to extensively browse and/or navigate through search results to find an informative search result). For example, the informative search results may correspond to search results that provide the user associated with the first client device with background information associated with a subject associated with the one or more first keywords).

Alternatively and/or additionally, the first plurality of search results may be generated based upon the one or more first keywords. The first plurality of search results may be ranked based upon the first list of suggested queries, the plurality of rankings associated with the first list of suggested queries and/or the one or more first suggested queries to generate a second plurality of rankings associated with the first plurality of search results. In some examples, a ranking of the second plurality of rankings may be generated based upon a level of relevance of a search result of the first plurality of search results with the first list of suggested queries and/or the one or more first suggested queries. In some examples, a ranked list of search results may be generated based upon the first plurality of search results and/or the second plurality of rankings. For example, the first plurality of search results may be arranged (based upon the second plurality of rankings) to generate the ranked list of search results. For example, a search result of the first plurality of search results with a higher ranking of the second plurality of rankings may be presented above (e.g., preceding and/or higher up in the ranked list of search results) a search result that with a lower ranking of the second plurality of rankings. It may be appreciated that by ranking the first plurality of search results based upon the first list of suggested queries, the plurality of rankings associated with the first list of suggested queries and/or the one or more first suggested queries to generate the ranked list of search results, informative search results may be more easily accessible to the user (e.g., the informative search results may be presented higher up in the ranked list of search results such that the user may not be required to extensively browse and/or navigate through search results to find an informative search result).

In some examples, the first list of suggested queries may be generated based upon the first query path and/or the second query path. For example, one or more first step queries of the first set of queries may be included in the first list of suggested queries. For example, the one or more first step queries may correspond to the fifth query associated with the first step of the first query path and/or the sixth query associated with the first step of the second query path. Alternatively and/or additionally, the one or more first suggested queries of the first list of suggested queries selected for presentation via the search interface may comprise the one or more first step queries.

In some examples, a selection of a query of the one or more first step queries may be received via the search interface. For example, a selection of the fifth query associated with the first step of the first query path may be received. In some examples, responsive to receiving the selection of the fifth query associated with the first step of the first query path, a search associated with the fifth query may be performed to generate and/or present a third plurality of search results associated with the fifth query. Alternatively and/or additionally, a second list of suggested queries may be generated and/or presented via the search interface responsive to receiving the selection of the fifth query associated with the first step of the first query path. For example, the second list of suggested queries may comprise one or more queries associated with the second step of the second query path. For example, one or more second step queries associated with the first query path (e.g., one or more queries of the second set of queries associated with the second step of the first query path) may be included in the second list of suggested queries and/or may be presented via the search interface.

Figure 5A:
FIG. 5A is a component block diagram illustrating an example system for generating a list of suggested queries associated with one or more keywords, where a search interface is presented and/or accessed by a first device.

FIGS. 5A-5F illustrate examples of a system 501 for generating a list of suggested queries associated with one or more keywords. FIG. 5A illustrates a first device 500 (e.g., the first client device) presenting and/or accessing the search interface. The search interface may be accessed via a browser of the first device 500. For example, the browser may comprise an address bar 502 comprising a web address (e.g., a Uniform Resource Locator (URL)) of a first web page 508 associated with the search interface. In some examples, the first web page 508 may comprise a search field 506. For example, the one or more first keywords (e.g., "Smartphone") may be entered into the search field 506. In some examples, the first web page 508 may comprise a search selectable input 504 corresponding to performing a search based upon the one or more first keywords. For example, the search selectable input 504 may be selected. Alternatively and/or additionally, the first plurality of queries may be determined based upon the one or more first keywords (by the machine learning model). Alternatively and/or additionally, the first plurality of sets of queries (of the first plurality of queries) may be determined based upon the one or more first keywords.

Figure 5B:
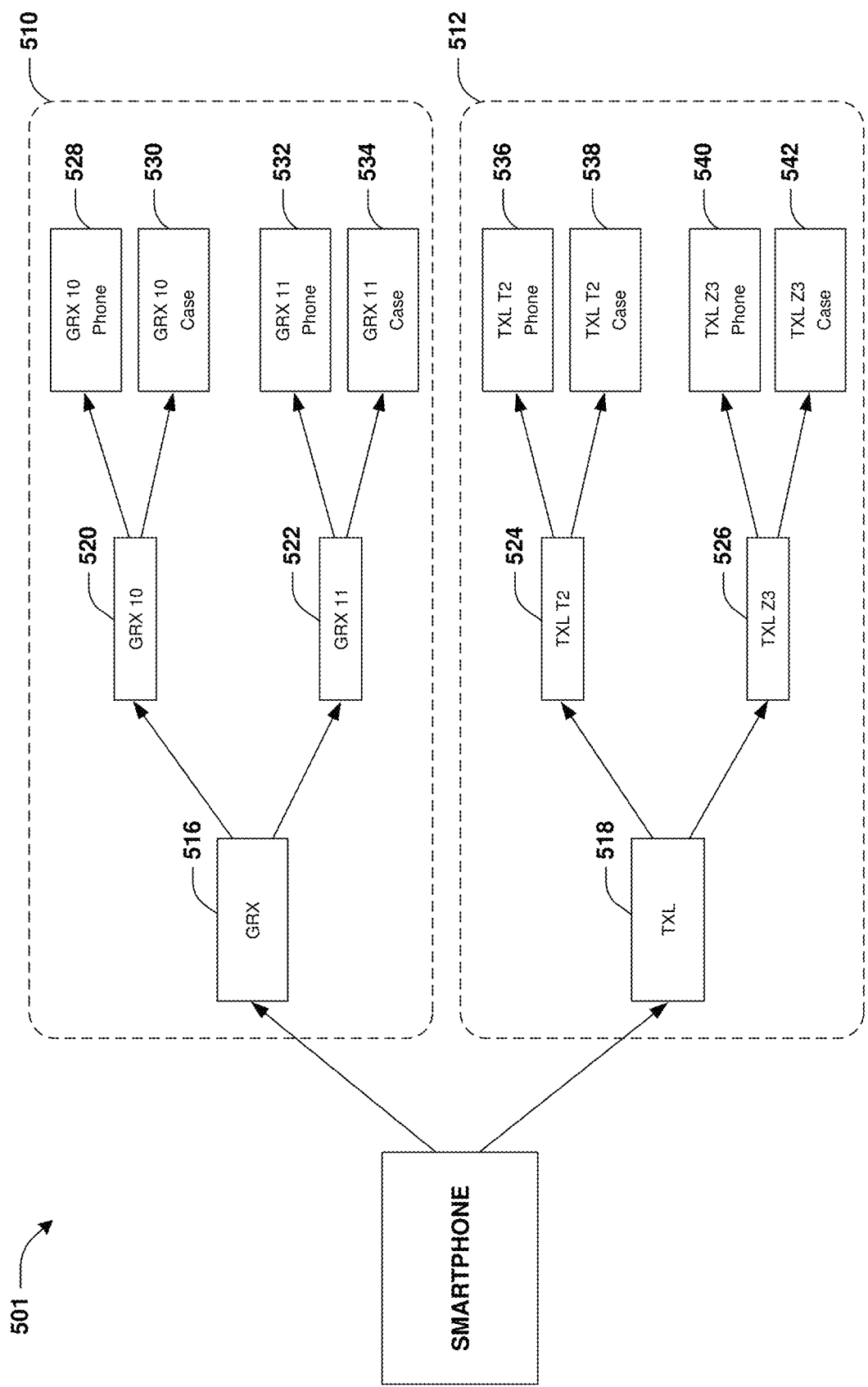
FIG. 5B is a component block diagram illustrating an example system for generating a list of suggested queries associated with one or more keywords, where a plurality of query paths associated with one or more first keywords are determined.

FIG. 5B illustrates a plurality of query paths associated with the one or more first keywords being determined. For example, a first query path 510 (e.g., the first query path) and/or a second query path 512 (e.g., the second query path) may be determined based upon the one or more first keywords. For example, a first set of queries of the first plurality of sets of queries may be determined based upon the one or more first keywords. In some examples, the first set of queries may be associated with and/or may yield search results providing information associated with smartphones (e.g., the first set of queries may comprise smartphone brands).

The first set of queries may comprise a first query 516 (e.g., "GRX") associated with a first smartphone brand. In some examples, the first query 516 may be associated with a first step of the first query path 510. Alternatively and/or additionally, the first set of queries may comprise a second query 518 (e.g., "TXL") associated with a second smartphone brand. In some examples, the second query 518 may be associated with a first step of the second query path 512.

In some examples, a second set of queries of the first plurality of sets of queries may be determined based upon the first query 516. For example, the second set of queries may comprise a third query 520 (e.g., "GRX 10") associated with a first smartphone model associated with the first smartphone brand and/or a fourth query 522 (e.g., "GRX 11") associated with a second smartphone model associated with the first smartphone brand. In some examples, the second set of queries may be associated with a second step of the first query path 510.

Alternatively and/or additionally, a third set of queries of the first plurality of sets of queries may be determined based upon the second query 518. For example, the third set of queries may comprise a fifth query 524 (e.g., "TXL T2") associated with a third smartphone model associated with the second smartphone brand and/or a sixth query 526 (e.g., "TXL Z3") associated with a fourth smartphone model associated with the second smartphone brand. In some examples, the third set of queries may be associated with a second step of the second query path 512.

Alternatively and/or additionally, one or more first sets of queries of the first plurality of sets of queries may be determined based upon the second set of queries. In some examples, the one or more first sets of queries may be associated with a third step of the first query path 510. For example, a fourth set of queries of the one or more first sets of queries may be determined based upon the third query 520. The fourth set of queries may comprise a seventh query 528 (e.g., "GRX 10 Phone") associated with a product associated with the first smartphone model and/or an eighth query 530 (e.g., "GRX 10 Case") associated with a product associated with the first smartphone model. Alternatively and/or additionally, a fifth set of queries of the one or more first sets of queries may be determined based upon the fourth query 522. The fifth set of queries may comprise a ninth query 532 (e.g., "GRX 11 Phone") associated with a product associated with the second smartphone model and/or a tenth query 534 (e.g., "GRX 11 Case") associated with a product associated with the second smartphone model.

Alternatively and/or additionally, one or more second sets of queries of the first plurality of sets of queries may be determined based upon the third set of queries. In some examples, the one or more second sets of queries may be associated with a third step of the second query path 512. For example, a sixth set of queries of the one or more second sets of queries may be determined based upon the fifth query 524. The sixth set of queries may comprise an eleventh query 536 (e.g., "TXL T2 Phone") associated with a product associated with the third smartphone model and/or a twelfth query 538 (e.g., "TXL T2 Case") associated with a product associated with the third smartphone model. Alternatively and/or additionally, a seventh set of queries of the one or more second sets of queries may be determined based upon the sixth query 526. The seventh set of queries may comprise a thirteenth query 540 (e.g., "TXL Z3 Phone") associated with a product associated with the fourth smartphone model and/or a fourteenth query 542 (e.g., "TXL Z3 Case") associated with a product associated with the fourth smartphone model.

Figure 5C:
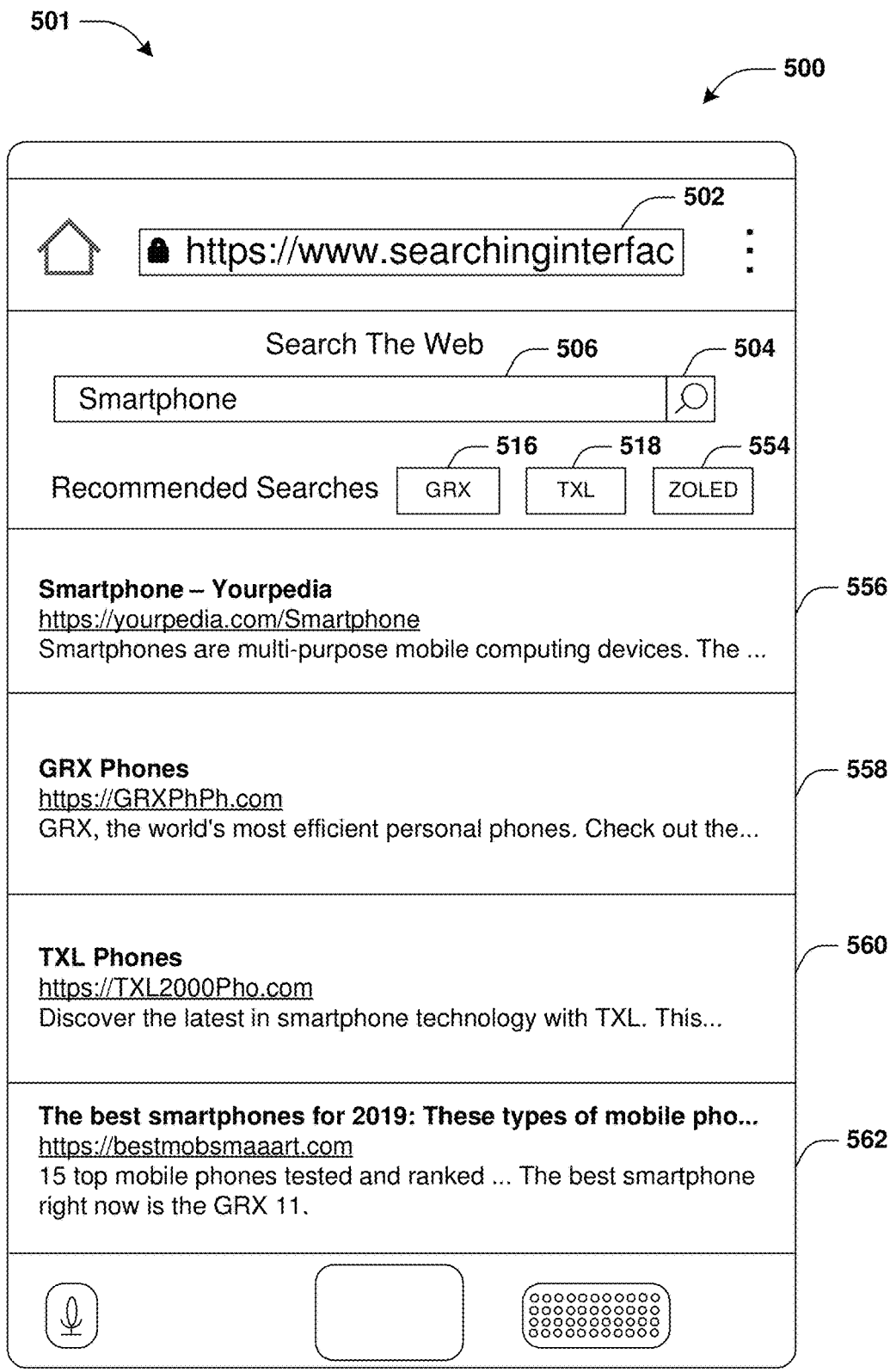
FIG. 5C is a component block diagram illustrating an example system for generating a list of suggested queries associated with one or more keywords, where a first list of search results associated with one or more first keywords and/or a first list of suggested queries associated with the one or more first keywords are presented by a first device.

FIG. 5C illustrates the first device 500 presenting a first list of search results associated with the one or more first keywords and/or a first list of suggested queries associated with the one or more first keywords. In some examples, the first list of suggested queries may be determined based upon the one or more first keywords and/or the plurality of sets of keywords. In some examples, one or more first suggested queries of the first list of suggested queries may be presented via the search interface. For example, the one or more first suggested queries may comprise one or more queries of the first set of queries. For example, the one or more first suggested queries may comprise the first query 516 associated with the first step of the first query path 510, the second query 518 associated with the first step of the second query path 512 and/or a fifteenth query 554 (e.g., "ZOLED") associated with a third smartphone brand.

Alternatively and/or additionally, the first list of search results may be generated based upon the one or more first keywords and/or the one or more first suggested queries. For example, a first search result 556 and/or a second search result 562 may correspond to web pages associated with the one or more first keywords. Alternatively and/or additionally, a third search result 558 may correspond to a web page associated with the first query 516 (e.g., the third search result 558 may be determined based upon the first query 516). Alternatively and/or additionally, a fourth search result 560 may correspond to a web page associated with the second query 518 (e.g., the fourth search result 560 may be determined based upon the second query 518). In some examples, a selection of the first query 516 may be received via the first list of suggested queries.

Figure 5D:
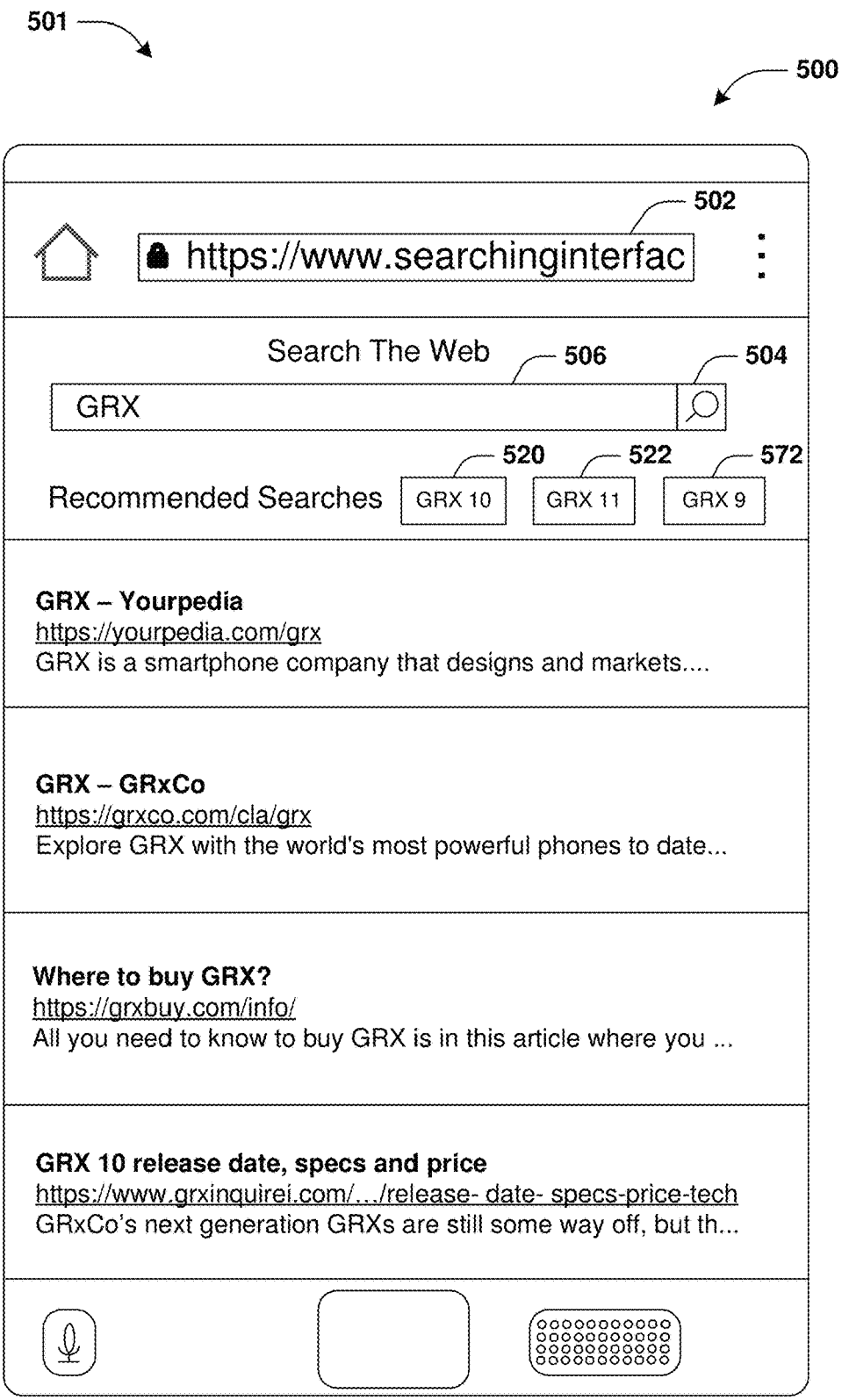
FIG. 5D is a component block diagram illustrating an example system for generating a list of suggested queries associated with one or more keywords, where a second list of search results associated with a first query and/or a second list of suggested queries associated with the first query are presented by a first device.

FIG. 5D illustrates the first device 500 presenting a second list of search results associated with the first query 516 and/or a second list of suggested queries associated with the first query 516. For example, the second list of suggested queries may be determined based upon the first query 516. For example, the second list of suggested queries may be determined and/or the second list of search results may be presented responsive to receiving the selection of the first query 516. For example, the second list of suggested queries may comprise the third query 520, the fourth query 522 and/or a sixteenth query 572 (e.g., "GRX 9") associated with the second step of the first query path 510. For example, the second list of suggested queries may comprise queries associated with the second step of the first query path 510 based upon the selection of the first query 516 associated with the first step of the first query path 510. In some examples, a selection of the third query 520 may be received via the second list of suggested queries.

Figure 5E:
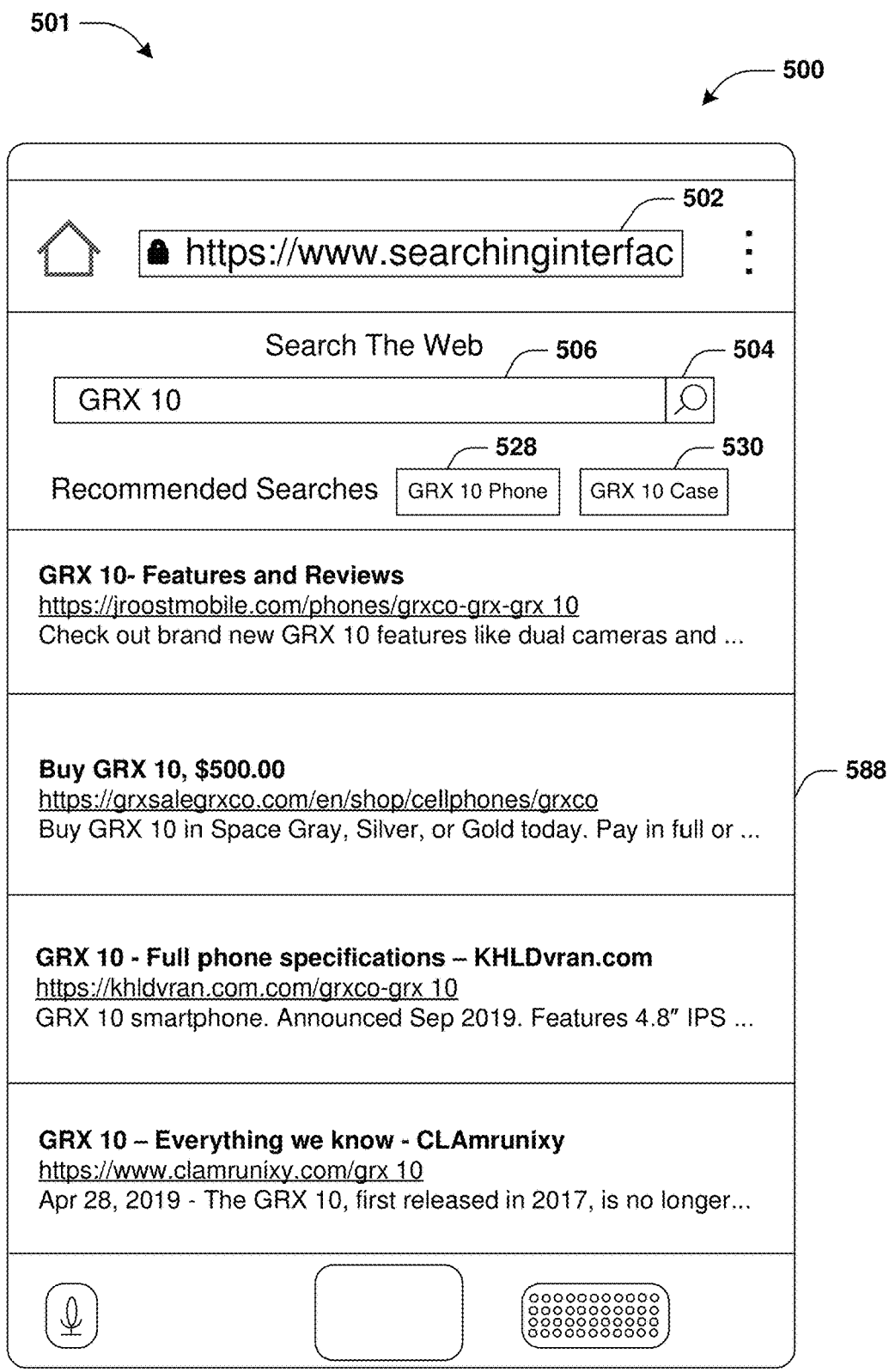
FIG. 5E is a component block diagram illustrating an example system for generating a list of suggested queries associated with one or more keywords, where a third list of search results associated with a third query and/or a third list of suggested queries associated with the third query are presented by a first device.

FIG. 5E illustrates the first device 500 presenting a third list of search results associated with the third query 520 and/or a third list of suggested queries associated with the third query 520. For example, the third list of suggested queries may be determined based upon the third query 520. For example, the third list of suggested queries may be determined and/or the third list of search results may be presented responsive to receiving the selection of the third query 520. For example, the third list of suggested queries may comprise the seventh query 528 and/or the eighth query 530 associated with the third step of the first query path 510 (and/or associated with the third query 520). For example, the third list of suggested queries may comprise queries associated with the third step of the first query path 510 (and/or associated with the third query 520) based upon the selection of the third query 520 associated with the second step of the first query path 510.

Figure 5F:
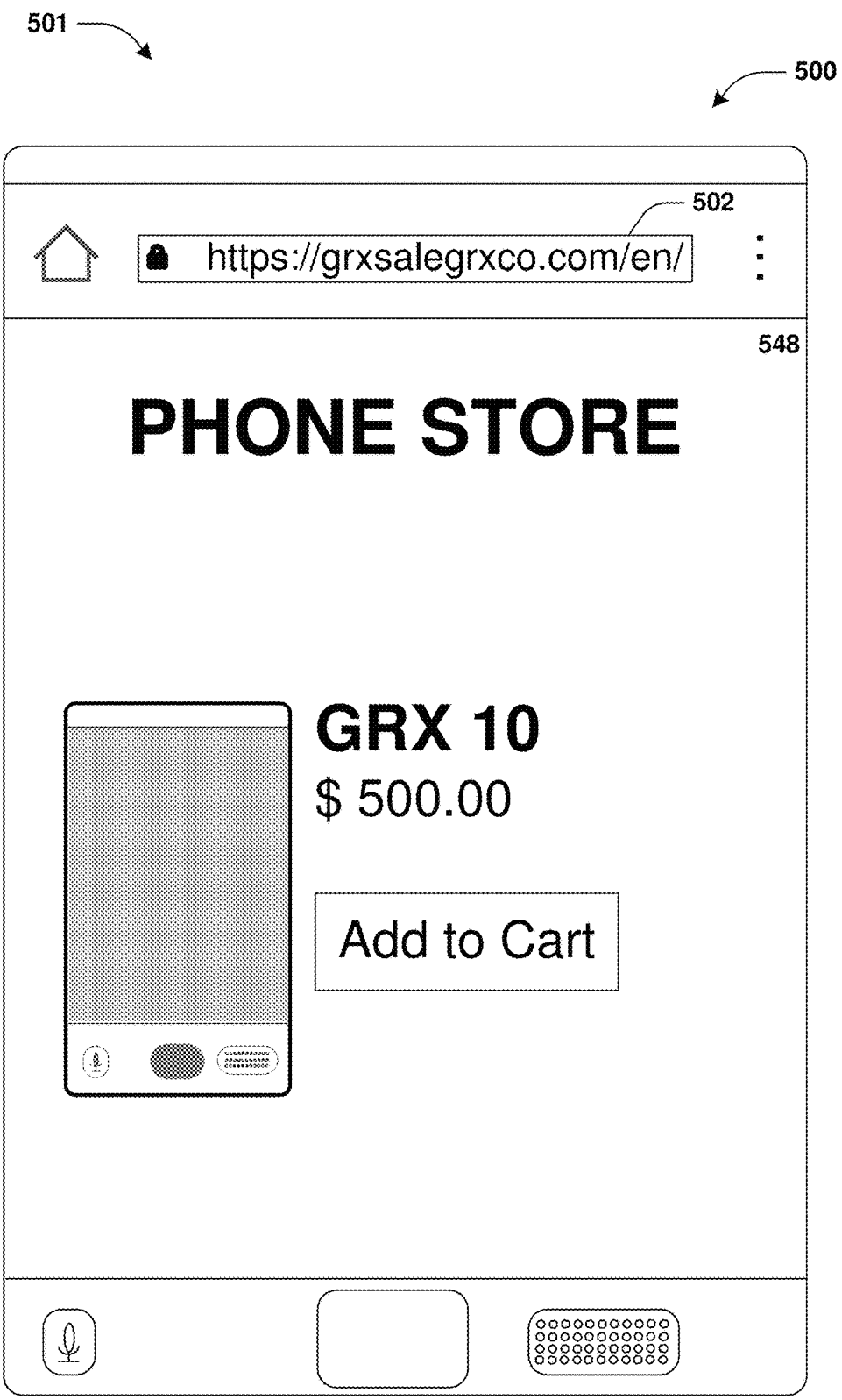
FIG. 5F is a component block diagram illustrating an example system for generating a list of suggested queries associated with one or more keywords, where a second web page is presented by a first device responsive to a selection of a fifth search result.

In some examples, a fifth search result 588 of the third list of search results may be associated with a second web page 548 (illustrated in FIG. 5F). For example, a selection of the fifth search result 588 may be received.

FIG. 5F illustrates the first device 500 presenting the second web page 548. In some examples, the second web page 548 may be presented responsive to the selection of the fifth search result 588.

It may be appreciated that the disclosed subject matter may assist a user (and/or a client device associated with the user) in identifying queries associated with one or more keywords entered into a search interface and/or in using the queries to obtain informative search results providing the user with information associated with the one or more keywords.

Implementation of at least some of the disclosed subject matter may lead to benefits including, but not limited to, a technical improvement to the functionality of a computer-implemented search engine and/or a computer-implemented content provider, and/or a reduction in screen space and/or an improved usability of a display (e.g., of the client device) (e.g., as a result of determining suggested queries based upon sequences of queries in a historical query database and/or based upon query sequence pairs in the historical query database, as a result of ranking the suggested queries and/or presenting one or more suggested queries having rankings above a threshold rank such that the user may more quickly and/or easily find queries that the user has an interest in and/or such that the user may more quickly and/or easily find one or more search results that the user has an interest in, wherein the user does not need to navigate through various search results to find the one or more search results that the user has an interest in, etc.).

Alternatively and/or additionally, implementation of at least some of the disclosed subject matter may lead to benefits including an improved efficiency and/or speed of a computer-implemented search engine (e.g., as a result of determining suggested queries associated with a plurality of query paths and/or multiple steps of each query path based upon one or more received keywords such that one or more second suggested queries associated with a second step of a first query path may be determined prior to receiving a selection of a suggested query associated with a first step of the first query path, wherein responsive to receiving the selection of the suggested query associated with the first step of the first query path, the one or more second suggested queries associated with the second step of the first query path may be more quickly presented as a result of determining the one or more second suggested queries associated with the second step prior to receiving the selection of the suggested query associated with the first step and/or storing the one or more second suggested queries in memory (e.g., a cache), etc.).

Alternatively and/or additionally, implementation of at least some of the disclosed subject matter may lead to benefits including a reduction in bandwidth (e.g., as a result of providing improved and/or more informative query suggestions such that a need to perform multiple searches is decreased due to the improved query suggestions, as a result of providing improved and/or more informative search results such that a need to navigate through and/or download various pages of search results is decreased due to the improved and/or more informative search results, etc.).

Alternatively and/or additionally, implementation of at least some of the disclosed subject matter may lead to benefits including more accurate and precise identification and/or transmission of content to intended users (e.g., as a result of analyzing sequences of queries to determine query sequence pairs, as a result of providing improved and/or more informative query suggestions and/or search results based upon the query sequence pairs and received keywords, etc.).

In some examples, at least some of the disclosed subject matter may be implemented on a client device, and in some examples, at least some of the disclosed subject matter may be implemented on a server (e.g., hosting a service accessible via a network, such as the Internet).

Figure 6:
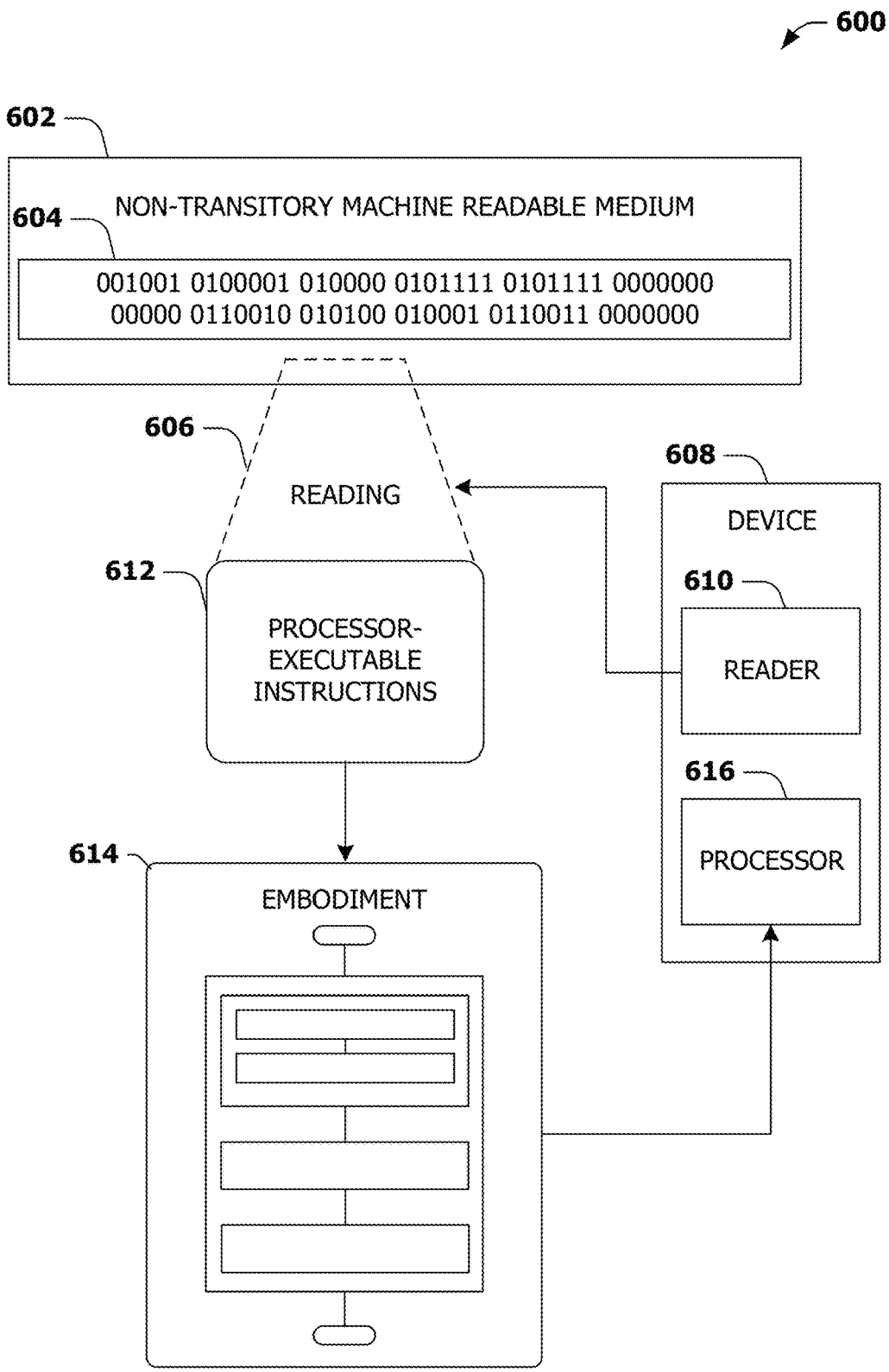
FIG. 6 is an illustration of a scenario featuring an example non-transitory machine readable medium in accordance with one or more of the provisions set forth herein.

FIG. 6 is an illustration of a scenario 600 involving an example non-transitory machine readable medium 602. The non-transitory machine readable medium 602 may comprise processor-executable instructions 612 that when executed by a processor 616 cause performance (e.g., by the processor 616) of at least some of the provisions herein (e.g., embodiment 614). The non-transitory machine readable medium 602 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disc (CD), digital versatile disc (DVD), or floppy disk). The example non-transitory machine readable medium 602 stores computer-readable data 604 that, when subjected to reading 606 by a reader 610 of a device 608 (e.g., a read head of a hard disk drive, or a read operation invoked on a solid-state storage device), express the processor-executable instructions 612. In some embodiments, the processor-executable instructions 612, when executed, cause performance of operations, such as at least some of the example method 400 of FIG. 4, for example. In some embodiments, the processor-executable instructions 612 are configured to cause implementation of a system, such as at least some of the example system 501 of FIGS. 5A-5F, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer and/or machine readable media, which if executed will cause the operations to be performed. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
   determining a sequence of queries based upon a first query and a second query, wherein the sequence of queries is indicative of the second query being received after the first query is received;
   determining, based upon one or more keywords and a historical query database comprising a plurality of historical queries, a plurality of queries associated with the one or more keywords; and
   generating, based upon a plurality of sequences of queries associated with a plurality of search sessions associated with the plurality of historical queries, a plurality of relationship scores associated with the plurality of queries determined based upon the historical query database comprising the plurality of historical queries, wherein:
      the plurality of sequences of queries used to generate the plurality of relationship scores comprises the sequence of queries and a second sequence of queries;
      a relationship score of the plurality of relationship scores is associated with a relationship between a query of the plurality of queries and the one or more keywords; and
      a second relationship score of the plurality of relationship scores is associated with a second relationship between another query of the plurality of queries and the one or more keywords.

2. The method of claim 1, comprising:
ranking the plurality of queries based upon the plurality of relationship scores to generate a plurality of rankings associated with the plurality of queries, wherein a list of suggested queries is generated based upon the plurality of rankings.

3. The method of claim 2, wherein the list of suggested queries comprises a first suggested query above a second suggested query based upon a first ranking of the first suggested query being higher than a second ranking of the second suggested query.

4. The method of claim 1, comprising:
presenting, via a search interface, one or more suggested queries.

5. The method of claim 2, comprising:
determining that one or more rankings associated with one or more suggested queries of the list of suggested queries meet a rank threshold.

6. The method of claim 5, comprising:
presenting, via a search interface, the one or more suggested queries.

7. The method of claim 1, comprising:
determining a first query path associated with the one or more keywords, wherein the first query path comprises a query, of the plurality of queries, corresponding to a first step of the first query path and one or more second queries, of the plurality of queries, corresponding to a second step of the first query path; and
determining a second query path associated with the one or more keywords, wherein the second query path comprises a third query, of the plurality of queries, corresponding to a first step of the second query path and one or more fourth queries, of the plurality of queries, corresponding to a second step of the second query path.

8. The method of claim 7, comprising generating a list of suggested queries comprising including the query corresponding to the first step of the first query path and the third query corresponding to the first step of the second query path in the list of suggested queries.

9. The method of claim 8, comprising:
presenting at least a portion of the list of suggested queries comprising the query corresponding to the first step of the first query path and the third query corresponding to the first step of the second query path;
receiving a selection of the query corresponding to the first step of the first query path; and
presenting, based upon the selection of the query corresponding to the first step of the first query path, the one or more second queries corresponding to the second step of the first query path.

10. The method of claim 1, comprising:
removing queries from the plurality of queries responsive to determining that the queries are associated with relationship scores that do not meet a threshold relationship score.

11. The method of claim 1, wherein the one or more keywords correspond to a query, the method comprising:
presenting, via a search interface, a plurality of search results corresponding to a plurality of web pages associated with the one or more keywords.

12. The method of claim 1, wherein the one or more keywords correspond to a query, the method comprising:
generating a first set of search results based upon the one or more keywords;
generating a second set of search results based upon a list of suggested queries; and
presenting, via a search interface, a plurality of search results corresponding to a plurality of web pages, wherein the plurality of search results comprises the first set of search results associated with the one or more keywords and the second set of search results associated with the list of suggested queries.

13. The method of claim 2, wherein the one or more keywords correspond to a query, the method comprising:
generating a plurality of search results corresponding to a plurality of web pages associated with the one or more keywords;
ranking the plurality of search results based upon at least one of the plurality of rankings or the list of suggested queries to generate a second plurality of rankings associated with the plurality of search results;
generating a ranked list of search results based upon the plurality of search results and the second plurality of rankings; and
presenting, via a search interface, the ranked list of search results.

14. The method of claim 1, wherein a search session of the plurality of search sessions is associated with a third sequence of queries, the method comprising:
training a machine learning model using a second plurality of sequences of queries associated with the plurality of search sessions, wherein the second plurality of sequences of queries are associated with the one or more keywords.

15. The method of claim 14, wherein the plurality of relationship scores is generated using the machine learning model.

16. The method of claim 14, comprising generating a list of suggested queries using the machine learning model.

17. A non-transitory machine readable medium having stored thereon processor-executable instructions that when executed cause performance of operations, the operations comprising:
determining, based upon one or more keywords and a historical query database comprising a plurality of historical queries, a plurality of queries associated with the one or more keywords;
generating, based upon a plurality of search sessions associated with the plurality of historical queries, a plurality of relationship scores associated with the plurality of queries determined based upon the historical query database comprising the plurality of historical queries, wherein:
a relationship score of the plurality of relationship scores is associated with a relationship between a query of the plurality of queries and the one or more keywords; and
a second relationship score of the plurality of relationship scores is associated with a second relationship between another query of the plurality of queries and the one or more keywords;
determining a first query path associated with the one or more keywords, wherein the first query path comprises a first query, of the plurality of queries, corresponding to a first step of the first query path and one or more second queries, of the plurality of queries, corresponding to a second step of the first query path; and
generating a list of suggested queries comprising the first query corresponding to the first step of the first query path and a third query corresponding to a second query path.

18. The non-transitory machine readable medium of claim 17, the operations comprising at least one of:

presenting at least a portion of the list of suggested queries comprising the first query corresponding to the first step of the first query path;
receiving a selection of the first query corresponding to the first step of the first query path; or
presenting, based upon the selection of the first query corresponding to the first step of the first query path, the one or more second queries corresponding to the second step of the first query path.

19. A computing device comprising:
a processor; and
memory comprising processor-executable instructions that when executed by the processor cause performance of operations, the operations comprising:
  determining a sequence of queries based upon a first query and a second query, wherein the sequence of queries is indicative of the second query being received after the first query is received;
  determining, based upon one or more keywords and a historical query database comprising a plurality of historical queries, a plurality of queries associated with the one or more keywords; and
  generating, based upon a plurality of sequences of queries associated with a plurality of search sessions associated with the plurality of historical queries, a plurality of relationship scores associated with the plurality of queries determined based upon the historical query database comprising the plurality of historical queries, wherein:
    the plurality of sequences of queries used to generate the plurality of relationship scores comprises the sequence of queries and a second sequence of queries; and
    a relationship score of the plurality of relationship scores is associated with a relationship between a query of the plurality of queries and the one or more keywords.

20. The computing device of claim 19, the operations comprising:
ranking the plurality of queries based upon the plurality of relationship scores to generate a plurality of rankings associated with the plurality of queries, wherein a list of suggested queries is generated based upon the plurality of rankings.

* * * * *